US009413815B2

(12) United States Patent
Walker et al.

(10) Patent No.: US 9,413,815 B2
(45) Date of Patent: Aug. 9, 2016

(54) METHODS AND APPARATUSES FOR IMPARTING FUNCTIONALITY TO A MOBILE COMPUTING DEVICE

(75) Inventors: Scott Vernon Walker, Albuquerque, NM (US); Bryan Lawson Bingham, Albuquerque, NM (US); Lawrence Paul Abeyta, Albuquerque, NM (US)

(73) Assignee: APPCityLife, Inc., Albuquerque, NM (US)

( * ) Notice: Subject to any disclaimer, the term of this patent is extended or adjusted under 35 U.S.C. 154(b) by 218 days.

(21) Appl. No.: 13/978,021

(22) PCT Filed: Jan. 5, 2012

(86) PCT No.: PCT/US2012/020313
§ 371 (c)(1),
(2), (4) Date: Aug. 15, 2013

(87) PCT Pub. No.: WO2012/094482
PCT Pub. Date: Jul. 12, 2012

(65) Prior Publication Data
US 2013/0332519 A1 Dec. 12, 2013

Related U.S. Application Data

(60) Provisional application No. 61/429,960, filed on Jan. 5, 2011.

(51) Int. Cl.
*H04L 29/08* (2006.01)
*G06F 9/445* (2006.01)
(52) U.S. Cl.
CPC ............ *H04L 67/10* (2013.01); *G06F 9/44505* (2013.01); *G06F 9/44526* (2013.01)

(58) Field of Classification Search
CPC ............ H04L 67/10; H04L 67/34; G06F 3/00
See application file for complete search history.

(56) References Cited

U.S. PATENT DOCUMENTS 6,986,135 B2 * 1/2006 Leathers .................... G06F 8/60 709/223
7,519,575 B1 * 4/2009 Simpson ........... G06F 17/30067
(Continued)

FOREIGN PATENT DOCUMENTS

WO     WO 2010024820 A2 *  3/2010  ............ G06F 9/4443
WO     WO 2012/094482         7/2012

OTHER PUBLICATIONS

PCT/US2012/020313 International Search Report and Written Opinion mailed Mar. 21, 2012.

*Primary Examiner* — Uzma Alam
(74) *Attorney, Agent, or Firm* — Lewis Roca Rothgerber Christie LLP

(57) ABSTRACT

Embodiments of the present invention comprise a client application ("shell") that is installed on the mobile device. The shell is developed in such a way as to allow it to read certain configuration files ("configuration files"). As discussed in greater detail below, the configuration files contain all information necessary for the shell to create, present, or display a mobile application "on-the-fly" simply by reading the configuration file. Advantageously, this method allows applications to quickly be updated or reconfigured without recompiling and updating native code. In addition, such applications can easily be shared and interact with other applications developed on this platform. This sharing of configuration files with a shell also allows repurposing of applications and a new delivery mechanism for advertising and promotional content.

14 Claims, 3 Drawing Sheets

(56) References Cited

U.S. PATENT DOCUMENTS

| | | | | |
|---|---|---|---|---|
| 7,779,085 B2* | 8/2010 | Neil | | G06F 9/4443 709/217 |
| 2005/0091670 A1* | 4/2005 | Karatal | | G06F 8/10 719/328 |
| 2005/0091672 A1* | 4/2005 | Debique | | G06F 8/20 719/328 |
| 2005/0193104 A1* | 9/2005 | Mason | | H04L 67/36 709/223 |
| 2006/0089147 A1* | 4/2006 | Beaty | | H04W 4/00 455/445 |
| 2009/0133014 A1* | 5/2009 | Laurila | | G06F 8/60 717/174 |
| 2009/0144631 A1* | 6/2009 | Berryman | | G06F 9/445 715/736 |
| 2010/0281475 A1* | 11/2010 | Jain | | G06F 8/68 717/172 |
| 2011/0321028 A1* | 12/2011 | Evans | | G06F 8/68 717/170 |

* cited by examiner

METHODS AND APPARATUSES FOR IMPARTING FUNCTIONALITY TO A MOBILE COMPUTING DEVICE

CROSS-REFERENCE TO RELATED APPLICATIONS

The present application is a national stage application and claims the priority benefit of PCT application number PCT/US2012/020313 filed Jan. 5, 2012. which claims the priority benefit of U.S. provisional application No. 61/429,960 filed Jan. 5, 2011. the disclosures of which are incorporated herein by reference.

BACKGROUND OF THE INVENTION

To date, mobile applications that utilize a mobile operating system's native functionality (such as Apple iOS and Google Android) must be developed and recompiled to add new native functionality to the application. The process of redeveloping and recoding new functionality into the application can be time consuming and expensive. Therefore, a need exists in the art to allow rapid development and deployment of new functionality and features into mobile applications and that can be shared with applications across multiple operating systems.

Disclosure of the Invention

Embodiments of the present invention comprise a client application ("shell") that is installed on the mobile device. The shell is developed in such a way as to allow it to read certain configuration files ("configuration files"). As discussed in greater detail below, the configuration files contain all information necessary for the shell to create, present, or display a mobile application "on-the-fly" simply by reading the configuration file. Advantageously, this method allows applications to quickly be updated or reconfigured without recompiling and updating native code. In addition, such applications can easily be shared and interact with other applications developed on this platform. This sharing of configuration files with a shell also allows repurposing of applications and a new delivery mechanism for advertising and promotional content. Furthermore, since the shell is not interpreting a language to build the mobile application, the shell code is static and is known when the original application was released.

Configuration files are defined using the application platform to define and manage applications and configuration files. Configuration files can also be shared across applications running on multiple mobile operating systems, allowing the design, development and management of a similar user experience across multiple operating systems.

A mobile application can be defined by a set of features and a user interface ("UI"). A system to define those features and their UI is defined in a configuration file that can be used to create the application. Changes to the configuration file can be downloaded to the application from a network server to dynamically reconfigure the application features and its UI. This system can have tiered or otherwise cooperative configurations that can be linked and delivered dynamically. The system can be used to deliver promotions on the mobile device.

Embodiments of the present invention provide a method of imparting functionality to a mobile device, comprising: (a) loading a shell application into storage on the mobile device; (b) loading a configuration definition into storage on the mobile device; (c) Initiating operation of the shell application according to the definitions in the configuration definition.

In some embodiments, the shell application comprises software configured to access native functionality in the mobile device and to render user interface features according to definitions in a configuration definition.

In some embodiments, the configuration definition comprises information stored in storage on the mobile device, which information specifies user interface style, data sources, resources, and actions.

In some embodiments, the specification of the user interface style comprises specification of one or more of: layout of user interface elements, background display, sorting of user interface elements, grouping of user interface elements, displayed fonts, or a combination thereof.

In some embodiments, actions specify an operation of the mobile that device that initiate one or more of: (1) a physical occurrence outside the device; (2) a transfer of information into or away from the mobile device; (3) creation of data and storage of said data on the device.

In some embodiments, actions specify an operation that is specific to the native functionality provided by the type of device on which the shell application is operating.

In some embodiments, the shell is responsive to events, and initiates one or more actions in response to an event, wherein the actions initiated are determined from the event, the state of the user interface, and the configuration definition.

In some embodiments, the configuration definition includes identification of one or more additional configurations, and conditions under which the shell will cause an additional configuration to be loaded and used as the configuration in step (c).

In some embodiments, the configuration definition includes identification of methods to access one or more additional configurations, and conditions under which the shell will cause an additional configuration to be loaded and used as the configuration in step (c).

In some embodiments, the configuration definition comprises definition of one or more actions that collect analytics and store them on the device, communicate analytics from the device to a remote system, or a combination thereof.

Some embodiments further comprise verifying the authority of the remote system to receive the analytics prior to communicating analytics to the remote system.

Embodiments of the present invention provide a method of supplying new functionality to a mobile device having resident in storage one or more configuration definitions configured to impart functionality to the mobile device when operated in combination with a shell application on the mobile device, comprising (a) communicating a command from a remote system to the device, (b) at a time when the shell application is active, and when a configuration determined from the command is active, storing information determined from the command in storage on the mobile device in association with the determined configuration definition. Some embodiments further comprise verifying the command before step (b).

In some embodiments, the mobile device has resident in storage a second shell application, and further comprises (c) at a time when the second shell application is active, and when a second configuration determined from the command is active, storing information determined from the command in storage on the mobile device in association with the second determined configuration.

Embodiments of the present invention provide a method of supplying new functionality to a plurality of mobile devices, each having resident in storage one or more configuration definitions configured to impart functionality to the mobile device when operated in combination with a shell application on the mobile device, comprising selecting the plurality of devices based on characteristics of the mobile device (e.g., enough memory, appropriate hardware or software version), a user of the mobile device (e.g., gender of the user or owner, age of the user or owner, registration status relative to other services such as subscriptions), current conditions of the present device (e.g., current location, power status such as plugged in or not, communication status such as whether connected to a wifi network), past or present use of the mobile device (e.g., accessed certain web sites, made online purchases), or a combination thereof; and communicating to each device according to the methods described herein.

Embodiments of the present invention provide a method of supplying new functionality to a mobile device having resident in storage one or more configuration definitions configured to impart functionality to the mobile device when operated in combination with a shell application on the mobile device, comprising: (a) using the shell application to determine whether an update to a configuration definition is available, (b) using the shell application to receive the update and storing the update in storage on the mobile device in association with the configuration definition.

DETAILED DESCRIPTION

Modes for Carrying Out the Invention and Industrial Applicability

Figure 1:
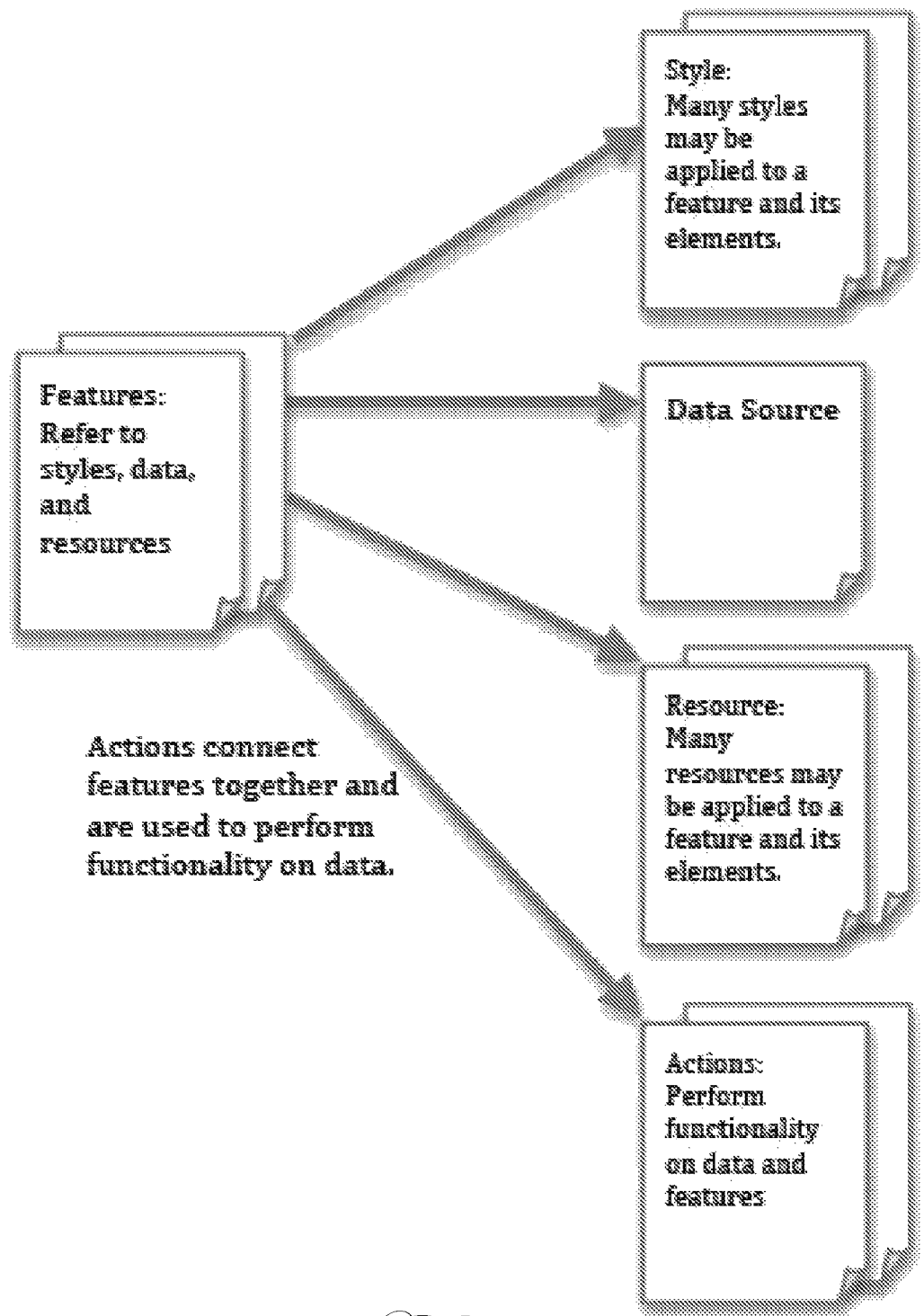
FIG. 1 is a schematic illustration of an embodiment of the present invention.

According to embodiments of the present invention and referring to FIG. 1, a configuration creator defines a configuration file by defining, without limitation: (1) features, (2) actions that manipulate those features, (3) styles that define the look-and-feel of the features, (4) data sources that define the data feeds for the features, (5) resources that define various images, video, and data.

An application can be defined in a configuration file by first defining a feature such as the top navigation feature, e.g., a tab navigation controller, image navigation controller, or list navigation controller.

Features

A configuration file can contain many types of features, such as lists to display data, maps to show pin locations on a map, collections of images that can be viewed and manipulated, videos that can be played in a video player, Facebook wall that displays comments from a Facebook account, etc.

According to an embodiment of the present invention, features provide for presentation of data in various ways. This can be represented by a controller or set of controllers, or other ways to implement native user interface elements such as windows, toolbars, text, etc. For example, a collection feature presents homogeneous data in a list controller and details of the data in an item view controller. A collection feature can also be used to display many types of data, e.g. products, search results, images, etc. Features can also be defined to have properties specific to that feature, for example, list or item controllers can have interactive action bars, search bars, buttons on the navigation bar, etc. A map feature has properties to show a map in standard, satellite or hybrid view. Some controllers are combined together to create commonly used features, such as Facebook wall, Twitter feed, YouTube channel, RSS feed, etc. Other features may contain foreground and background image properties. These properties can be used to design unique UI to enhance the "look and feel" of applications. Foreground images can be linked to actions that navigate to other features or configurations.

Actions

Figure 2:
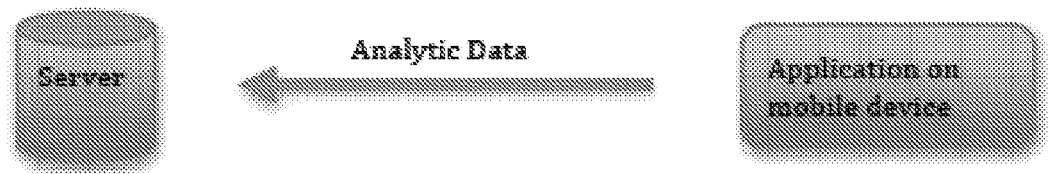
FIG. 2 is a schematic illustration of an embodiment of the present invention.

According to embodiments of the present invention, actions operate to connect features and allow the user to interact with data in a feature. For example, a navigation action can be defined that links a street address to a map feature. The action defines how to take an address from one feature and show a map feature and drop a pin on the map. According to embodiments of the present invention, actions can perform various functionality, e.g. dial a phone, send e-mail, send a Tweet, write a comment on a Facebook wall, launch another configuration, etc. Actions are logged for analytic data. Events, such as an application start, wake, sleep are also logged as analytic data. User gestures such as tabs, swipes, and shakes can also be event with associated actions. This analytic data can be grouped and uploaded from the mobile device to a server to be used for analytic data analysis as shown in FIG. 2.

Styles

Styles define the look and feel of features within the UI. A style defines the font size and color, border colors, background colors, placement of text or images, e.g. top, bottom, left, right, center, etc. Styles are created and applied to features to create the UI. Styles can be applied at different levels of a feature and use inheritance from a global level down to each data element within a feature.

Data Sources

Data sources define where data comes from and the format of the data. According to embodiments of the present invention, various data formats are supported, such as xml, json, plist, url, etc. For example, an xml data source may be used to identify a particular url for data retrieval. The xml data source can also define the data fields and types of data that are returned, and how to retrieve specific fields from the data, using xpath for example. Data sources also support a caching mechanism that determines when data should be refreshed, e.g. download once, by date or time, never cached, etc.

Resources

Resources are data that can be used by features. According to embodiments of the present invention, resources can be images, videos, other configuration files, or user-entered data. As examples, resources can be stored on the device, on external devices connected to the device, in the cloud/Internet, or a combination thereof.

Deployment

A shell can utilize more than one configuration file. Embodiments of the present invention incorporate a versioning mechanism so that the shell can determine if a 'newer' configuration file is available from a server and if the configuration file is compatible with the current shell.

Figure 3:
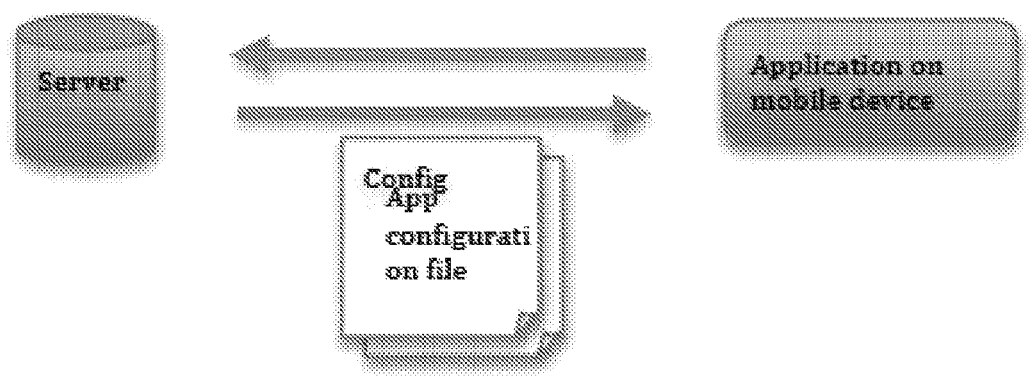
FIG. 3 is a schematic illustration of an embodiment of the present invention.
Figure 4:
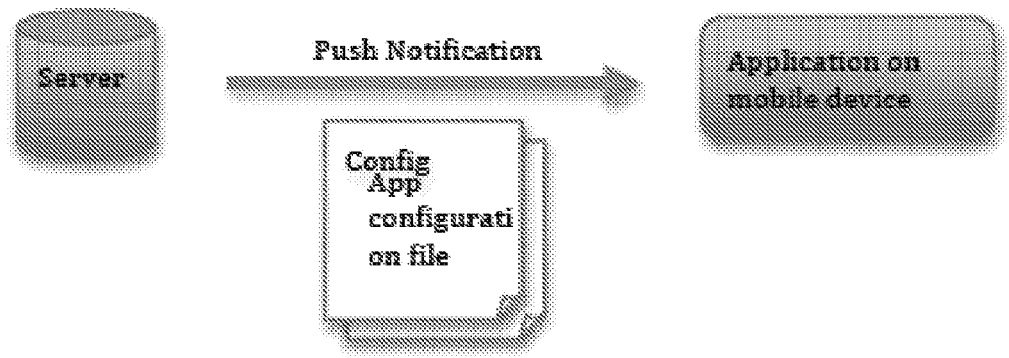
FIG. 4 is a schematic illustration of an embodiment of the present invention.

One having ordinary skill in the art will recognize that configuration files can be delivered to a shell via various mechanisms including: 1) bundled with the application, 2) discovered by an API on the server, 3) delivered by Push Notification as shown in FIGS. 3 and 4, 4) downloaded via a standard hyperlink in an email message, Twitter tweet, QR code, etc.

Figure 5:
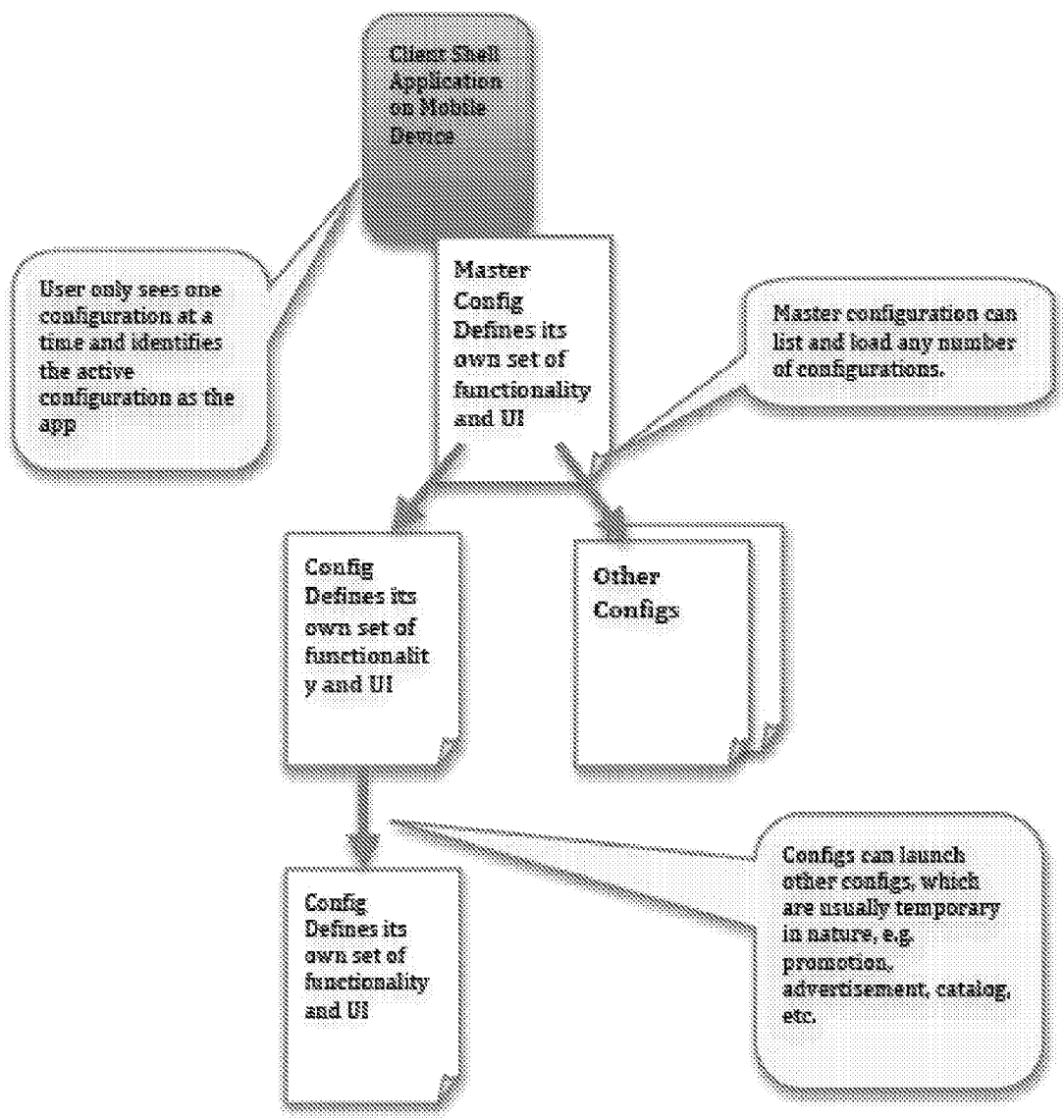
FIG. 5 is a schematic illustration of an embodiment of the present invention.

According to embodiments of the present invention and referring to FIG. 5, configuration files can be used to create a template for reuse. Configuration files created from a configuration template will contain the exact same functionality as the original configuration file. The new configuration file can then be modified to add additional functionality. In addition, configuration files can be "tiered" to utilize other configuration files. This modular approach allows developers to essentially "assemble" applications from pre-defined configuration files or create configuration files for template or reuse purposes. In this way, developers can quickly and easily create applications based on changing needs or use patterns.

According to embodiments of the present invention, an application always designates an active configuration file. The active configuration file is what the user sees and interacts with when the application is launched. When an application sleeps or is closed, the then-active configuration file is restored when the application starts or wakes. If a configuration file is launched from another configuration file and the application is closed, the launched configuration file remains active until the configuration file restores the calling configuration file. The active configuration file can be replaced at any time by mechanisms previously noted, thereby modifying the behavior of the application. Multiple configuration files can also be active, for example one configuration file can be active for each display in a system having multiple displays.

The present invention can also be embedded in other applications that provide desirable functionality, such as SDK libraries.

Example Embodiment. The shell application is an Apple IOS application created using the normal Apple tools and submitted to the Apple AppStore for distribution using normal methods.

Configurations are created by users with web-based creation and management software deployed on a webserver (configuration server). The configuration server also permits creation and management of notifications/commands that can be delivered to and retrieved by those configurations. The shell application, based on information included in a particular configuration, uses HTTP webservice APIs to communicate with the configuration server for that configuration to receive updated configuration definitions, notifications, additional data associated with notifications, and to deliver analytics.

Alternatively, updated configuration definitions can be stored in the cloud using a commercial service such as Amazon S3 or Dropbox. Similarly, analytics from a configuration can be stored using such services. These details are defined in the configuration file and can be modified at any time.

Example Embodiment. The capabilities of the present invention can be provided as a library and SDK for other developers to incorporate in their products.

The shell application functionality can be packaged in such a way that a mobile application developer can include it in a native application of their own design. Configuration creation and management can be provided by a configuration server as above, a 3rd party service, or custom-designed and deployed by the app developer themselves.

Example Embodiment. The present invention can be used to provide a "Showcase" function, providing a shell application and configuration that defines and modifies configurations on the device itself.

A configuration is provided that can create, modify, and manage other configurations using standard configuration features or by other means, such as a configuration server described above that has a UI formatted for display in a mobile browser. This can also be accomplished with an embodiment that does not use a configuration server at all. Configurations can be delivered via Bluetooth and similar technologies; the same or different shell applications on different devices can share configurations in this way with no need for a configuration server. Configurations can be delivered to Apple IOS applications using In-App Purchase, a service provided by Apple to facilitate various kinds of business models.

The present invention has been described as set forth herein in relation to various example embodiments and design considerations. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method of imparting functionality to a mobile device, the method comprising:
    receiving a shell application at a mobile device, the shell application received over a network, wherein the shell application accesses native functionality of the mobile device;
    loading the shell application into memory of the mobile device;
    receiving a first configuration file at the mobile device, the first configuration file received over the network, wherein the first configuration file defines a first mobile application and includes a first plurality of configuration definitions that define a first user interface, a first data source, a first resource, and a first operation to be performed by the mobile device using the first resource;
    loading the first configuration file into memory of the mobile device;
    initiating operation of the shell application according to the first plurality of definitions in the first configuration file;
    receiving a second configuration file at the mobile device, the second configuration file received over the network, wherein the second configuration file is different than the first configuration file, defines a second mobile application different from the first mobile application, and includes a second plurality of configuration definitions that define a second user interface, a second data source, a second resource, and a second operation to be performed by the mobile device using the second resource;
    automatically reconfiguring the shell application in response to a predetermined event by replacing the first plurality of configuration definitions stored in memory with the second plurality of configuration definitions; and
    initiating operation of the shell application according to the second plurality of configuration definitions.

2. The method of claim 1, wherein the definition defining the first user interface includes a definition of an appearance including one or more of: a layout and grouping of user interface elements, a background and foreground display, a sorting and organization of data, a color of user interface elements, one or more displayed fonts, or a combination thereof.

3. The method of claim 1, wherein the first operation to be performed by the mobile device initiates one or more of: a physical occurrence outside the device, a transfer of information into or away from the mobile device, or creation of data and storage of the data on the device.

4. The method of claim 1, wherein the first operation is specific to the native functionality provided by the type of device on which the shell application is operating.

5. The method of claim 1, wherein the event is initiated by the mobile device, by the user of the mobile device, or by a remote computing device system.

6. The method of claim 1, wherein the first plurality of configuration definitions includes an identification of one or more additional configurations to be loaded, the one or more additional configurations including the second configuration file.

7. The method of claim 1, wherein the first plurality of configuration definitions includes an identification of one or more conditions under which the shell application will cause an additional configuration to be loaded, the one or more conditions including the predetermined event.

8. The method of claim 1, wherein the first operation to be performed by the mobile device collects analytics, stores analytics, communicates analytics from the device to a remote computing device, or a combination thereof.

9. The method of claim 8, further comprising verifying the authority of the remote computing device to receive the analytics prior to communicating analytics to the remote computing device.

10. A method of supplying additional functionality to a mobile device having resident in storage one or more configuration definitions that impart functionality to the mobile device when operated in combination with a shell application on the mobile device, the method comprising
receiving a first command from a remote computing device at the mobile device at a time when the shell application is active;
identifying a first configuration definition determined from the first command as active, the first configuration definition defining a first mobile application, wherein defining the first mobile application includes defining a first user interface, a first data source, a first resource, and a first operation to be performed by the mobile device using the first resource;
storing information determined from the first command in storage on the mobile device in association with the determined first configuration definition;
receiving a second command from the remote computing device; and
reconfiguring the shell application in response to the second command by replacing the first configuration definition stored in memory with a second configuration definition different than the first configuration definition, the second configuration definition defining a second mobile application, wherein defining the second mobile application includes defining a second user interface, a second data source, a second resource, and a second operation to be performed by the mobile device using the second resource.

11. The method of claim 10, further comprising verifying the second command before reconfiguring the shell application.

12. The method of claim 10, wherein the mobile device has resident in storage a second shell application, and wherein the method further includes storing the information determined from the first command at a time when the second shell application is active.

13. A method of supplying additional functionality to a plurality of mobile devices, each having resident in storage one or more configuration definitions that impart functionality to the mobile device when operated in combination with a shell application on the mobile device, the method comprising:
selecting the plurality of devices based on characteristics of each mobile device, a user of each mobile device, current conditions of each device, past or present use of each mobile device, or a combination thereof;
sending a first command from a remote computing device to each mobile device at a time when the shell application is active, the first command identifying a first configuration definition defining a first mobile application, wherein defining the first mobile application includes defining a first user interface, a first data source, a first resource, and a first operation to be performed by the mobile device using the first resource; and
sending a second command from the remote computing device to each mobile device, wherein the second command causes each mobile device to reconfigure the shell application in response to the second command by replacing the first configuration definition with a second configuration definition different than the first configuration definition, the second configuration definition defining a second mobile application, wherein defining the second mobile application includes defining a second user interface, a second data source, a second resource, and a second operation to be performed by the mobile device using the second resource.

14. A method of supplying additional functionality to a mobile device having resident in storage one or more configuration definitions that impart functionality to the mobile device when operated in combination with a shell application on the mobile device, the method comprising:
using the shell application to determine that an update to a first configuration definition is available, the first configuration definition defining a first mobile application, wherein defining the first mobile application includes defining a first user interface, a first data source, a first resource, and a first operation to be performed by the mobile device using the first resource;
using the shell application to receive the update, the update including a second configuration definition different than the first configuration definition, the second configuration definition defining a second mobile application, wherein defining the second mobile application includes defining a second user interface, a second data source, a second resource, and a second operation to be performed by the mobile device using the second resource;
storing the update in storage on the mobile device in association with the first configuration definition; and
automatically reconfiguring the shell application in response to the storing the update by replacing the first configuration definition with the second configuration definition.

* * * * *